United States Patent [19]
Adler et al.

[11] Patent Number: 5,461,289
[45] Date of Patent: Oct. 24, 1995

[54] DRIVE SYSTEM FOR A MOTOR VEHICLE

[75] Inventors: Uwe Adler, Schweinfurt; Hans-Jürgen Drexl, Schonungen; Dieter Lutz, Schweinfurt; Franz Nagler, Ottendorf; Martin Ochs; Stefan Schiebold, both of Schweinfurt; Hans-Joachim Schmidt-Brücken, Geldersheim; Wolfgang Thieler, Hassfurt; Michael Wagner, Niederwerm; Holger Westendorf, Hambach; Rainer Wychnanek, Madenhausen, all of Germany

[73] Assignee: Mannesmann Aktiengesellschaft, Dusseldorf, Germany

[21] Appl. No.: 211,369

[22] PCT Filed: Sep. 30, 1992

[86] PCT No.: PCT/DE92/00833

§ 371 Date: Jun. 20, 1994

§ 102(e) Date: Jun. 20, 1994

[87] PCT Pub. No.: WO93/07019

PCT Pub. Date: Apr. 15, 1993

[30] Foreign Application Priority Data

Oct. 4, 1991 [DE] Germany .......................... 41 33 059.5

[51] Int. Cl.⁶ ...................................................... B60L 11/02
[52] U.S. Cl. ........................... 318/139; 318/152; 290/14; 180/65.4
[58] Field of Search ...................... 318/139, 140, 318/145, 146, 147, 151, 152, 157; 290/8, 9, 14, 17, 45, 51; 180/65.1, 65.3, 65.4

[56] References Cited

U.S. PATENT DOCUMENTS 3,584,276  6/1971  Ringland et al. .
3,686,549  8/1972  Winebrener .
4,335,429  6/1982  Kawakatsu .
5,280,223  1/1994  Grabowski et al. .

Primary Examiner—Bentsu Ro
Attorney, Agent, or Firm—Cohen, Pontani, Lieberman, Pavane

[57] ABSTRACT

The drive arrangement for a motor vehicle includes an internal combustion engine (1) with at least one controlling element (29), an electric generator arrangement (3) driven by the internal combustion engine (1), at least one electric motor (11) which is powered by the generator arrangement (3) and drives the motor vehicle, and an electronic control unit (19) which, depending on the setting of an accelerator pedal (23), controls at least an actuating drive (27) and the electrical output generated by the generator arrangement (3) and/or the electrical output received by the electric motor (11). The arrangement contains a device for detecting an actual value of the speed of the internal combustion engine (1) and component for detecting an actual value of the electrical output generated by the generator arrangement (3). The control unit (19) has a speed regulating device (33) that maintains the actual speed at a given reference speed and an output regulating component (37) which maintains the actual electrical output at a given reference output. A data storage (31) in which performance data for combinations of data for the reference output with data for the reference speed and/or data for the adjustment of at least the actuating drive (27) are stored. In the event of dragging or motoring operation of the generator arrangement (3) and internal combustion engine (1), the control unit (19) detects the torque curve depending on the current of the generator arrangement (3) depending on the instantaneous angular position of the crankshaft and diagnoses operating errors and/or the state of the engine depending on the torque curve.

15 Claims, 2 Drawing Sheets

DRIVE SYSTEM FOR A MOTOR VEHICLE

BACKGROUND OF THE INVENTION

The invention is directed to a drive arrangement for a motor vehicle and, in particular, to a drive arrangement in which the motor vehicle is driven by at least one electric motor which is powered by a generator arrangement driven in turn by an internal combustion engine.

Conventional internal combustion engines of the type customarily used in motor vehicles can generate a desired output of determined magnitude at different engine speeds. In the family of characteristic curves or performance data for torque and engine speed, the operating points of identical output follow approximately hyperbolic characteristic lines corresponding to the relationship by which the output is substantially equal to the product of the engine speed and torque. However, different values of such operating parameters as specific fuel consumption, volume and composition of pollutants in the exhaust or noise development of the internal combustion engine are associated with the operating points of constant output in the performance data. An optimum for one of the operating parameters, e.g. specific fuel consumption, i.e. the fuel consumption with reference to the work performed, could be determined by appropriate selection of the operating points for each desired output.

In conventional motor vehicles driven by an internal combustion engine via a mechanical transmission, the operating points for a desired output can approximate the optimum of the operating parameters only within strict limits, since a selected change in the engine speed can only be made corresponding to the degree of the gear change.

A drive arrangement for a motor vehicle whose wheels are driven by separate electric motors is known from "VDI-Berichte" No. 878, 1991, pages 611 to 622. A generator driven by an internal combustion engine supplies the electric current to the electric motors. An electronic control unit controls the current supplied to the electric motors by the generator depending on the drive output selected by the driver of the motor vehicle via the accelerator pedal. Electric motors and generators suited to drives of this kind are known, for example, from the European Patent Application 0 159 005. A suitable control unit is described in the European Patent Application 0 340 686.

DE 32 43 515 A1 describes a strategy for adjusting the output and speed of the internal combustion engine of an electric diesel locomotive during the starting process. A locomotive is a railborne vehicle in which, unlike motor vehicles for road traffic, relatively constant driving conditions generally prevail within extensive phases of the driving operation. According to this prior art, unnecessarily high speeds of the internal combustion engine which would be the necessary outcome of the low drive output due to the low vehicle speed need only be prevented during the relatively brief phase of the starting process. For this purpose, below a given threshold value of the vehicle speed, the speed of the internal combustion engine is allowed to increase as the vehicle speed increases and in proportion to the rate of increase depending on the reference variable (reference output of the drive), so that when the threshold value of the vehicle speed is reached the speed achieves the reference speed in question and is maintained at this reference speed at higher speeds. Further, each reference speed has a fixed one-to-one correspondence with a reference output. During the starting process, the control unit ensures that the reference value of the electrical output of the generator of the vehicle is changed corresponding to the change in the actual speed of the internal combustion engine. As is clear from the embodiment example, both the increase in speed in the transitional range and the correspondence between the control variable and speed are predetermined arbitrarily as a linear function. There is no mention of the possibility of determining a certain reference output of the internal combustion engine as a function of given optimization criteria (e.g. consumption, noise emission, pollutant emission) with reference to a corresponding family of characteristic curves of the internal combustion engine.

Disturbances in the operation of an internal combustion engine are frequently manifested early on, but not perceived by the driver. Often, a reaction to such disturbances (e.g. shutting off the internal combustion engine) is made only after extensive damage has already occurred.

SUMMARY OF THE INVENTION

The object of the present invention is to provide a drive arrangement for a motor vehicle in which the monitoring of the operation of the internal combustion engine generating the drive output is improved over the prior art in order to minimize or even entirely prevent consequent damage.

The invention proceeds from a drive arrangement of the type mentioned above which includes:

- an internal combustion engine with at least one controlling element which affects its output and/or its torque and/or its speed and which is controllable by an actuating drive;
- an electric generator arrangement connected with the output shaft of the internal combustion engine so as to be fixed with respect to rotation relative thereto;
- at least one electric motor which is powered by the generator arrangement and drives the motor vehicle; and
- an electronic control unit which controls, depending on the setting of an accelerator pedal, at least the actuating drive and the electrical output generated by the generator arrangement and/or the electrical output received by the electric motor.

Also provided are means for detecting an actual value of the speed of the internal combustion engine or of the generator arrangement coupled with the latter and means for detecting an actual value of the electrical output generated by the generator arrangement and/or the electrical output received by the electric motor. The control unit has speed regulating means which maintain the actual speed at a given reference speed on the average with respect to time and output regulating means which maintain the actual electrical output at a given reference output on the average with respect to time. According to the invention, the control unit detects the instantaneous curve of the current of the generator arrangement as a function of the instantaneous angular position of the crankshaft of the internal combustion engine, determines the instantaneous curve of the torque of the internal combustion engine as a function of electric current depending on the angular position of the crankshaft, and compares the instantaneous curve of the torque with reference values for the magnitude and/or for the instantaneous curve of the torque which are stored in a data storage. In the event of deviations with respect to a predetermined quantity or a predetermined curve, a control signal representing an operating disturbance is generated. The invention makes use of the fact that the electrical output produced by the generator arrangement or the electrical output received by the electric motor is a measurement which can be measured comparatively simply and with great accuracy for the drive output generated by the internal combustion engine. The electrical efficiency of the generator arrangement and the electric losses of the control unit can also be determined relatively easily and then used to calculate retroactively the drive output of the internal combustion engine.

The invention is based on the understanding that the time curve of the current of the generator arrangement is a measurement for the torque produced by the internal combustion engine depending on the crankshaft angle and accordingly represents the time curve of the irregularity of the crankshaft revolution. The compression and defective operation, e.g. ignition failure and knocking, of the individual cylinders can be diagnosed by analyzing the torque curve. Moreover, the quantity of torque provides information for optimizing the ignition angle. Since the current of the generator arrangement is commutated and extensively smoothed, as the case may be, the current in the individual phase windings of the generator arrangement is advisably measured for determining torque fluctuations in the internal combustion engine. The control signal representing the operating disturbance can be used to alert the driver, e.g. by activating an alarm device. An error storage of a diagnostic system can also be set for storing data for subsequent repair work. Depending on the type of error diagnosed, action may be taken immediately while the internal combustion engine is operating in order to avoid further damage. For example, the maximum output and/or the maximum speed of the internal combustion engine can be limited to tolerable values or an emergency program reducing the quantity of fuel injected for a defective cylinder may be activated.

With regard to a second aspect of independent significance, the drive design upon which the invention is based enables more extensive diagnostic possibilities. The object of this aspect is also to determine information concerning the mechanical state of the internal combustion engine.

Based on the fundamental drive arrangement mentioned above, it is provided with regard to this aspect of the invention that during the motor operation of the generator arrangement the control unit detects the instantaneous curve of the current when the ignition is turned off and/or detects the fuel supplied to the internal combustion engine and, depending on this information, determines the instantaneous curve of the dragging or motoring torque produced by the generator arrangement depending on the crankshaft angle of the internal combustion engine. The control unit also detects deviations of the value and/or curve of the determined motoring torque from predetermined reference values and/or from a reference curve and generates a control signal representing an operating disturbance depending on the value and/or curve of the deviation.

This aspect of the invention is based on the idea that when the ignition or fuel supply is turned off the generator current represents the curve of the motoring torque of the internal combustion engine as a function of the crankshaft angle so that the mechanical state of the internal combustion engine may be deduced by analyzing the curve representing the electric current. For example, based on the electric current curve and accordingly the motoring torque curve, conclusions may be reached concerning the compression of individual cylinders, the operability of intake valves and exhaust valves, the condition of the bearings, in particular those of the crankshaft, or also the cylinder wall friction. The output required for motoring the internal combustion engine can be provided by an energy storage, e.g. a battery, or a generator driven by a flywheel or, in the case of deceleration of the vehicle in driving operation, can be supplied by the electric motor working in generator operation.

The control unit advisably stores the instantaneous curve of the motoring torque as a function of the angular position of the crankshaft in a data storage. In this way, the curve of the motoring torque can be detected for at least 720° of the crankshaft angle so that a complete work cycle of a four-cycle internal combustion engine can be analyzed.

In a preferred construction the control unit detects the speed and/or the temperature of the internal combustion engine during motor operation of the generator arrangement and determines the instantaneous curve of the motoring torque for a number of different values and/or at least one time-dependent curve of the speed and/or temperature. In this way, the mechanical characteristics of the internal combustion engine can be analyzed for different motoring torques and, moreover, the analysis may be made during the warm-up or cooling phase while the temperature changes, which allows for an improved extraction of information.

The "motoring diagnosis" need not take place for every vehicle thrust operation or each time the internal combustion engine is started. The control unit advisably checks the motoring torque for deviations from the given reference quantities only after a predetermined number of starting processes of the internal combustion engine and/or after a given mileage of the motor vehicle and/or above a fixed temperature of the internal combustion engine.

As was already mentioned above with respect to the diagnostic aspect of the invention, the instantaneous curve of the motoring torque is also determined in regard to this aspect of the invention from the current detected in the individual phase windings of the generator arrangement which includes a plurality of phase windings. Also, with this aspect of the invention, the control signal representing the operating disturbance of the invention can be used for the driver's information or for storage in a diagnostic system and a suitable emergency program can also be activated by the control signal.

The invention will be described in more detail in the following with reference to a drawing.

DETAILED DESCRIPTION OF THE PREFERRED EMBODIMENTS

Figure 1:
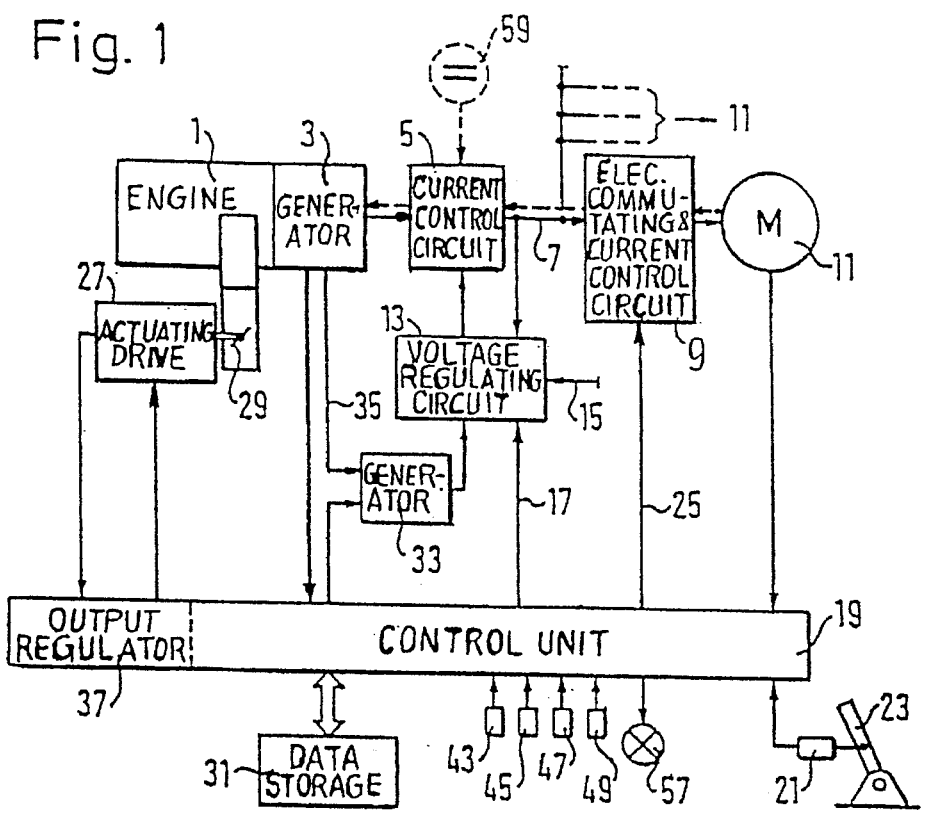
FIG. 1 shows a schematic view of a drive arrangement, according to the invention, for a motor vehicle.

The drive arrangement shown in FIG. 1 has a generator arrangement 3 driven by an internal combustion engine. This type of generator arrangement 3 has a plurality of phase windings on the stator side and permanent magnets on the rotor side. An electronic commutating and current control circuit 5 is connected to the phase windings (not shown in more detail) and transforms the alternating current supplied by the generator arrangement 3 when driven by the internal combustion engine into DC current of controllable magnitude by means of electronic commutation. The current control circuit 5 supplies a plurality of electronic commutating and current control circuits 9 of electric motors 11 via a DC intermediate circuit 7. Each electric motor 11 separately drives a wheel of the motor vehicle. FIG. 1 shows only one of the electric motors 11 with associated commutating and current control circuit. The electric motors 11 also preferably have a multiple-phase stator winding and a permanent-magnet rotor. A voltage regulating circuit 13 which detects the actual voltage of the DC intermediate circuit 7 and maintains it at a predetermined reference quantity at 15 via the current control circuit 5 is connected to the commutating and current control circuit 5.

The DC current supplied to the DC voltage intermediate circuit 7 by the current control circuit 5 can be controlled by a control unit 19 via a signal path 17.

The control unit 19 responds to the position of an accelerator pedal 23 detected by means of a sensor 21 and, depending on the position of the accelerator pedal, controls the electrical output available for the drive corresponding to the product of current times voltage of the DC voltage intermediate circuit. Moreover, the control unit 19 controls the current of the electric motors 11 and accordingly their driving torque via a signal path 25.

The electrical output supplied to the DC current intermediate circuit 7 must be applied by the internal combustion engine 1 so as to allow for the losses of the generator arrangement 3 and the current control circuit 5, i.e. so as to allow for the electrical efficiency of these components. The control unit 19 consequently controls an output adjusting element 29 of the internal combustion engine, e.g. a throttle valve or an injection pump, via an actuating drive 27, also in dependence on the accelerator pedal position.

Figure 2:
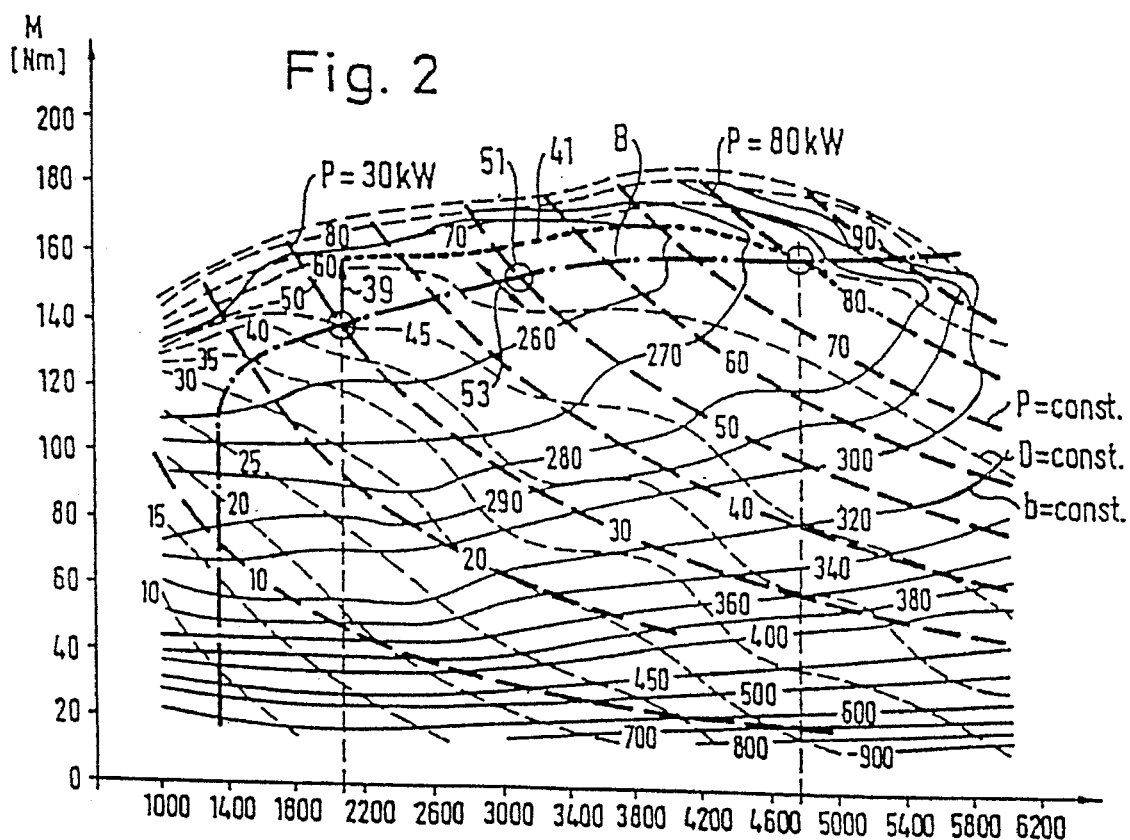
FIG. 2 shows engine performance data of an internal combustion engine of the arrangement according to FIG. 1 to illustrate the operation of the arrangement.
Figure 3:
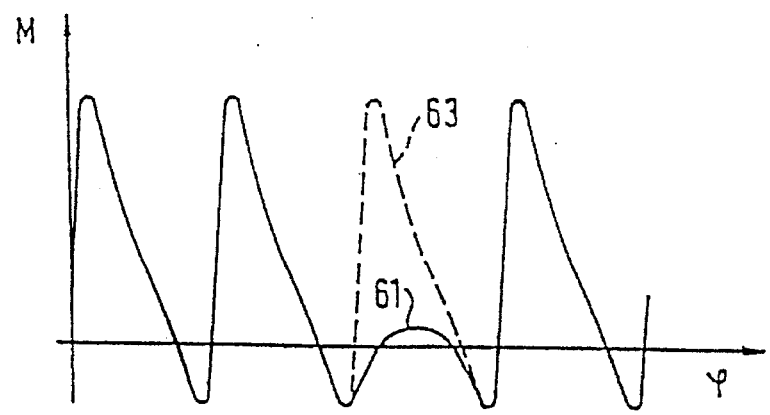
FIGS. 3, 4a and 4b show torque diagrams to illustrate diagnostic devices of the drive arrangement according to the invention.
Figure 4A:
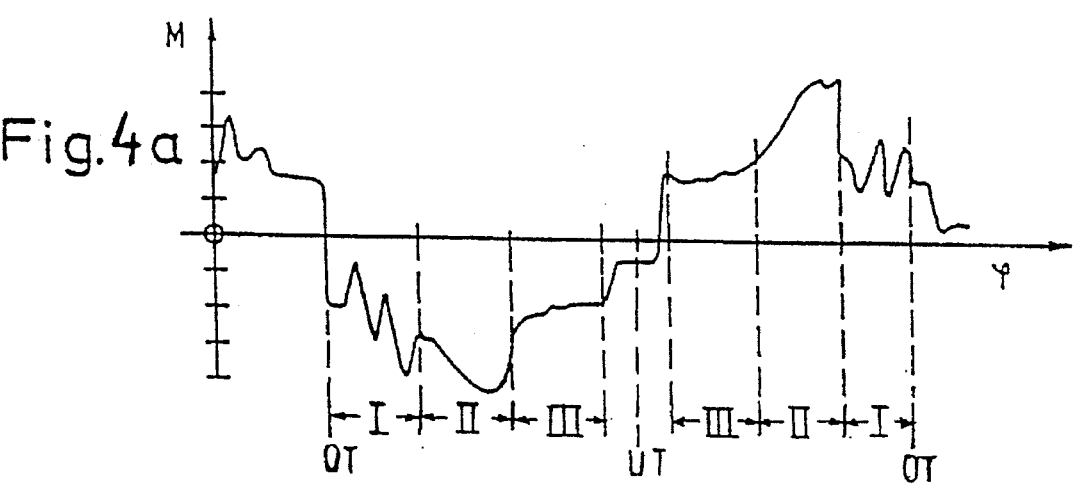
Figure 4B:
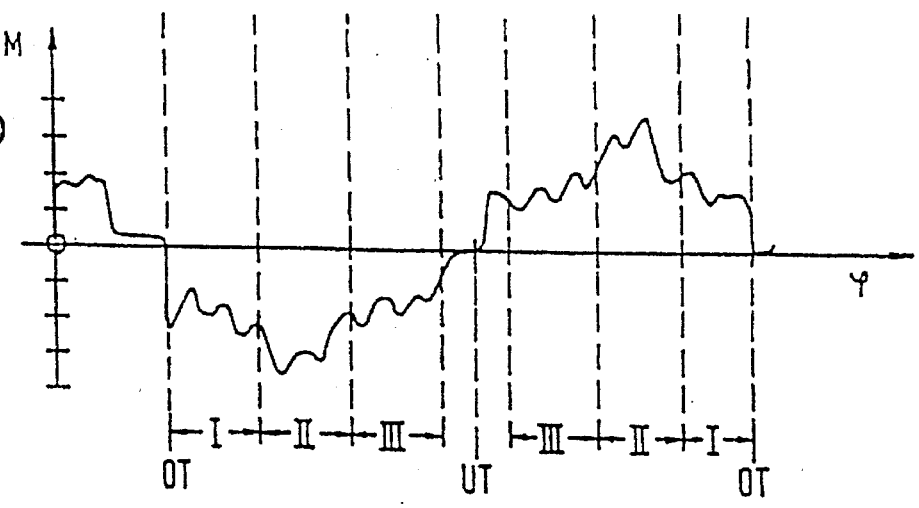

Due to the mechanical drive connection, the internal combustion engine 1 and the generator arrangement 3 operate at the same speed and the torque produced by the internal combustion engine in stationary operation is equal to the torque received by the generator arrangement 3. The output generated by the internal combustion engine is approximately proportional to the product of torque and speed. The same is true for the electrical output generated by the generator arrangement 3, which is equal to the output of the internal combustion engine 1 minus the loss in efficiency of the generator arrangement. The adjustment of the output element 29 of the internal combustion engine 1 on the one hand and the generator current adjusted at the current control circuit 5 on the other hand form two influencing variables which allow a substantially optional variation of the operating point of the internal combustion engine 1 in its characteristic field along a characteristic line of constant output. FIG. 2 shows the characteristic field of an internal combustion engine with 100 kW output. The characteristic field shows the torque M produced by the internal combustion engine and received by the generator arrangement as a function of the speed n. Curves P representing constant output of the internal combustion engine are shown in bold dashed lines in the characteristic field. The thin dashed lines D designate the adjustment of the output adjusting element of the internal combustion engine with indication of the throttle valve angle. Curves b with constant specific fuel consumption in grams per kilowatt hours are shown in the characteristic field of FIG. 2 by the solid thin lines. The characteristic field shows that operating points of identical output at different speeds can be achieved by suitable adjustment of the throttle valve angle, but that only one operating point with minimum specific fuel consumption is allocated to each output value. The operating points with minimum specific fuel consumption are shown in the characteristic field on a thick dash-dot line B. For example, the specific fuel consumption for an output of 30 kW is minimal at a throttle valve angle of 45° and a speed of approximately 2100 revolutions per minute.

The drive arrangement according to FIG. 1 makes it possible to operate the internal combustion engine 1 continuously in an operating point with minimum fuel consumption at least in stationary operation. For this purpose, data combinations of the characteristic field are stored in a data storage 31 of the control unit 19 which stores the operating points of characteristic line B for which minimum specific fuel consumption results. The stored data combinations include data for a reference speed and data for the adjustment of the output adjusting element of the internal combustion engine 1 for the operating points allocated to the individual output values. The control unit 19 reads the reference speed and the adjusting value of the controlling element 29 out of the data storage 31 as a function of the output reference value selected via the accelerator pedal 23. A speed control loop 33 which can be a component part of the control unit 19 regulates, via the current control circuit 5, the electrical output of the generator arrangement 33 to a value at which the speed equals the reference speed of the desired operating point. The information concerning actual speed which is supplied to the speed regulator 33 at 35 is detected, e.g., by means of a sensor or the like. Along with the adjustment of the speed, the control unit 19 adjusts the actuating drive 27 of the output adjusting element 29 to the throttle valve angle determined by the data combination.

The output actually generated by the internal combustion engine 1 can deviate from the reference output value upon which the data combination of the operating point is based due to the influences of temperature or other operating parameters of the internal combustion engine 1. For this reason, the control unit 19 has an output regulator, indicated at 37, which determines an actual output value depending on the electrical output determined by the current and voltage of the generator arrangement 3 and compares it with the reference output value corresponding to the position of the accelerator pedal. For the purpose of regulating the output, the control unit 19 checks whether or not the speed has reached the actual speed value and then permits the output regulator 37 acting on the actuating drive 27 to adjust the output to the reference output.

When the position of the accelerator pedal is changed, e.g. for increasing the output from P=30 kW to P=80 kW, the control unit 19 changes the throttle valve position D from 45° to an angle of 60° corresponding to the data combination of the new operating point at P=80 kW. The change in the throttle valve position causes an increase in torque which is shown in FIG. 2 by an arrow 39 so that the internal combustion engine 1 is accelerated to the speed of approximately 4750 revolutions per minute associated with the new operating point. After the speed regulator 33 adjusts the speed to this reference speed which is determined by the data combination of the new operating point, the output regulator 37 also regulates the output of the internal combustion engine 1 to the reference output of 80 kW determining the data combination of the new operating point. The speed-dependent curve of the engine torque during the change in output is shown by a dotted line 41 in FIG. 2.

The characteristic field of FIG. 2 shows the dependence of the torque M of the internal combustion engine on the speed of the unit formed by the internal combustion engine and the generator arrangement. However, the drive arrangement can also be controlled on the basis of a characteristic field which contains the electrical output of the generator arrangement 3 or current control 5 as parameter, that is, one which accounts for the efficiency of these components. The characteristic field of the specific fuel consumption is superimposed on the characteristic field of the torque of the internal combustion engine in FIG. 2, wherein the data combination already represents the operating points with minimum specific fuel consumption. However, the characteristic field of the specific fuel consumption b can also be stored separately and the control unit 19 can calculate the data combinations of the operating points in individual cases from a plurality of characteristic fields.

Fuel measuring devices, indicated at 43, which determine the actual fuel consumption are associated with the control unit 19. The fuel measuring devices may be flowmeters or the like or means which gather information concerning the amount of fuel which is supplied or injected from an electronic engine control system or determine it from the opening times of injection valves. The control unit 19 determines the specific actual fuel consumption from the amount of fuel actually supplied with reference to the output adjusted in the actual operating point. The data stored in the data storage 31 concerning specific fuel consumption are continuously updated on the basis of the actual consumption. In this way, the characteristic field is automatically adapted to changes in the internal combustion engine 1 caused by aging or scatter resulting from series manufacture. The characteristic field of the specific fuel consumption is adapted by increments, e.g. in such a way that the stored information concerning the specific fuel consumption is only changed by a comparatively small fraction of the actual deviation. In this way, the influence of measurement errors or the like in determining the specific fuel consumption in the characteristic field is kept small. Obviously, the control unit 19 also Corrects the operating points with minimum specific fuel consumption after updating the characteristic field, e.g. according to conventional iterative methods.

The consumption characteristic field is adapted as a function of additional operating parameters of the internal combustion engine 1, in particular as a function of the oil temperature or coolant temperature of the internal combustion engine 1 detected by a temperature sensor 45.

In addition to the specific fuel consumption, other operating parameters can also be taken into account in adjusting an optimum operating point of the internal combustion engine 1. For example, the output determining the operating point is also influenced by the ignition angle or the fuel-air mixture ratio or the temperature of the intake air. The data storage 31 can contain additional characteristic fields for these operating parameters. The data storage 31 also contains combination algorithms enabling the control unit 19 to evaluate the significance of the individual operating parameters and to determine an optimum of a plurality of operating parameters suited to the operating conditions depending on the evaluation.

The basis for determining the common optimum of a plurality of operating parameters consists in that the output supplied by the internal combustion engine or by the generator arrangement is maintained constant at the given reference output. This precondition makes it possible also to incorporate operating parameters into the optimization which are not oriented to fuel consumption. The operating variables affecting output are preferably varied by the control unit 10 in such a way that an optimum defined by the stored combination algorithms follows from the combination of the following objectives:

minimum specific fuel consumption;

minimum amount of pollutants and least harmful composition of pollutants;

minimum noise;

maximum protection of the internal combustion engine.

For this purpose, the control unit responds to a sensor 47 for determining the pollutant contents, e.g. a lambda probe and/or a sensor 49 for measuring noise. The data storage 31 accordingly contains characteristic fields for emission and composition of pollutants, a noise characteristic field and information concerning the protection of the engine. Obviously, the control unit 19 may also only take into account a portion of the characteristic fields mentioned above and these characteristic fields can also be updated if necessary as was already mentioned with reference to the characteristic field for the specific fuel consumption.

For example, the control unit 19 varies the ignition angle and the adjustment of the output adjusting element 29 jointly in such a way that the specific fuel consumption decreases at constant output, but without exceeding permissible maximum limits for emission of pollutants. For the adjustment of the operating point with the lowest specific fuel consumption, the control unit 19 varies the speed by means of the speed regulator 33 and varies the adjustment of the output adjusting element 29 in such a way that the determined output of the generator arrangement 3 remains constant. In the characteristic field of FIG. 2, this means that the operating point is guided along a curve of constant output as is indicated for an operating point 51 by a double arrow 53. The output regulator 37 provides for a change in the speed and adjustment of the output adjusting element 29 for maintaining constant output. The specific fuel consumption and possibly the values of the operating parameters which are to be taken into consideration beyond this are determined along the curve of constant output and stored in the data storage 31 together with the respective speed. If the specific fuel consumption increases with the movement along the curve of constant output, this is a sign that the actual operating point is removed from the optimal operating point. By means of a subsequent change in speed, the control unit 19 again provides for a more favorable specific fuel consumption. The adjustment of the speed favorable for minimum fuel consumption can also be effected while in driving operation so that the characteristic field for the exact specific fuel consumption need not necessarily be known in order to provide optimal operating conditions.

If a plurality of operating parameters are optimized, this is effected in such a way that all parameters are kept constant with the exception of those parameters which are to be changed.

The possibility of updating characteristic field data of the output characteristic field of the unit formed by the internal combustion engine and generator arrangement is made possible by an error diagnosis of the internal combustion engine as will be explained in the following.

To diagnose errors the control unit 19 monitors the characteristic field data for the specific fuel consumption which are stored in the data storage 31. By comparison with earlier data, in particular with an original reference characteristic field representing the state of the internal combustion engine 1 when new, information about the engine status, e.g. wear, may be obtained from the speed dependence and quantity of updated consumption data. In a four-cycle engine, for example, a sudden drop in the reciprocal value of the specific fuel consumption to 75% of the original value indicates a failure of one of the cylinders, e.g. due to a defective spark plug. Based on the current generated by the generator arrangement 3, in particular, the current in the individual phase windings which is not yet smoothed, the control unit 19 can determine the value of the periodically fluctuating torque of the internal combustion engine 1 as a function of the angular position of the crankshaft and can store it in the data storage 31 for diagnostic purposes. For example, the compression or defective operation of individual cylinders, e.g. due to ignition failure or knocking, may be detected from the stored torque curve. Ignition angle failures may be deduced from the torque value. FIG. 5 shows the curve of the torque as a function of the crankshaft angle $\phi$. An ignition failure appears in the torque curve at 61 in comparison with the correct torque curve shown in dashed lines at 63. The control unit 19 compares the determined torque curve of individual cylinders either with the curve resulting for other cylinders of the internal combustion engine or with stored reference values or reference curves for analysis.

When an error is determined, the control unit 19 generates an information signal alerting the driver, e.g. via a display 57, and stores the diagnosed error in the data storage as information for future repair work. If necessary, the control unit 19 activates an emergency program by changing the amount of fuel injected and, as the case may be, purposefully reduces or entirely shuts off the amount of fuel injected for individual cylinders. In addition or alternatively, the control unit 19 can reduce the maximum output of the internal combustion engine 1 and/or the maximum speed or can limit the attainable operating speed.

Under certain operating conditions, the generator arrangement 3 works as an electric motor which drags or motors the internal combustion engine 1. The electrical output required for this purpose is provided via the current control unit 5 from an energy storage 59, e.g. the vehicle battery, or from a flywheel-driven generator. When the vehicle is braked or decelerated, the electrical energy may also be supplied by the electric motors 11 which are then operating in generator operation as is indicated in FIG. 1 by output paths shown in dashed lines. When the fuel injection and ignition are turned off, the mechanical state of the internal combustion engine 1 may be deduced from analysis of the torque detected at the generator arrangement 3. Operating situations in which the generator arrangement 3 motors the internal combustion engine 1 occur, for example, when starting the internal combustion engine 1 by means of the generator arrangement 3 which then works as a motor prior to the commencement of the fuel injection and ignition or in driving operation when no output or torque is required of the internal combustion engine.

The motoring torque curves depending on the crankshaft angle make it possible to determine characteristic quantities describing the state of the internal combustion engine 1, in particular the compression of the individual cylinders, the operability of the intake valves and exhaust valves, the condition of the bearings, e.g. the crankshaft bearing, cylinder wall friction, etc. The control unit 19 detects the torque curve along at least 720°, i.e. over at least two crankshaft revolutions, so that the state of all cylinders can be analyzed also in a four-cycle internal combustion engine. Moreover, the control unit 19 controls the generator arrangement 3 in such a way that motoring torque curves can be detected at a number of different speeds and/or at a predetermined speed curve changing over time. Further, the control unit 19 makes it possible to detect the torque curve during a warm-up phase or cooling phase of the internal combustion engine 1 for different coolant or oil temperatures. Characteristic status quantities may be extracted or isolated in a more definite manner with knowledge of a plurality of motoring torque curves at different speeds and/or temperatures of the internal combustion engine 1. By way of example, FIG. 6a shows the curve of the motoring torque M of a single-cylinder two-cycle internal combustion engine with properly functioning crankshaft bearings detected by the control unit 19 depending on the crankshaft angle $\phi$. FIG. 6b shows the motoring torque curve of this internal combustion engine with defective crankshaft bearing. The top dead center is designated by OT; UT is the bottom dead center. The complete crankshaft revolution is divided symmetrically with respect to the top dead center into regions I, II and III which show characteristic, clearly distinguishable curves in the case of properly functioning crankshaft bearings (FIG. 6a). FIG. 6b, on the other hand, shows distinct deviations of the motoring torque curve in the case of a defective crankshaft bearing, particularly in region III, which are detected by the control unit 19 in the analysis of the motoring torque curve and are reported as bearing damage.

By detecting impermissible deviations of the motoring torque curve from reference values or reference curves, damage or imminent damage can be detected and localized promptly. The control unit 19 also responds to the detected error during the diagnosis with reference to the motoring torque curve in that the driver is alerted, e.g. via a display 57, and information on the diagnosed error is stored in the data storage for future repair work. Moreover, an emergency program can be activated while the error is actually occurring, e.g. by reducing the maximum output or maximum speed of the internal combustion engine 1 or by limiting the speed or by means of a purposeful change in the quantity of fuel injected for individual cylinders until the fuel injection is turned off in a defective cylinder for the purpose of reducing emission of pollutants.

The analysis of the motoring torque need not be effected in every vehicle thrust operation leading to a shutting down of the fuel supply or to ignition or each time the engine is started. The diagnosis can be made after a predetermined number of starting processes of the internal combustion engine 1 or after predetermined mileage readings. Insofar as there are also electronic control means of the motor, the motoring torque diagnosis can also be initiated by the motor control under determined operating conditions. The control unit 19 can also ensure that the diagnosis is made only above certain temperatures, i.e. when the internal combustion engine 1 is at operating temperature.

We claim:

1. A drive arrangement for a motor vehicle, comprising: an accelerator pedal; an internal combustion engine having a crankshaft; an electronic generator arrangement connected with the crankshaft of the internal combustion engine so as to be fixed with respect to rotation relative thereto; at least one electric motor provided so as to be powered by the generator arrangement and so as to drive the motor vehicle; and electronic control means for controlling at least one of an electrical output generated by the generator arrangement and an electrical output of the generator arrangement received by the electric motor as a function of accelerator pedal position, the electric motor that drives the motor vehicle being provided so as to work as a generator in thrust operation of the motor vehicle and the generator arrangement being provided so as to work as a motor in one of when starting the internal combustion engine and during thrust operation of the motor vehicle and drives the internal combustion engine, the electronic control means being provided so that during the motor operation of the generator arrangement, the control means performs at least one of detecting an instantaneous curve of current from the generator arrangement when ignition is turned on and detecting fuel supplied to the internal combustion engine, depending upon this detected information the control means determines an instantaneous curve of motoring torque produced by the generator arrangement depending on the crankshaft angle of the internal combustion engine, the control means further detects deviations of at least one of the value and the curve of the determined motoring torque from at least one of predetermined reference values and a reference curve, and generates a control signal representing an operating disturbance depending on at least one of the value and the curve of the deviation.

2. A drive arrangement according to claim 1, and further comprising a data storage, the control means stores an instantaneous curve of the motoring torque for at least 720° of the crankshaft angle in the data storage.

3. A drive arrangement according to claim 2, wherein the control means detects at least one of the speed and the temperature of the internal combustion engine during motor operation of the generator arrangement and determines at least one of the instantaneous curve of the motoring torque for a number of different values, at least one time-dependent curve of the speed, and temperature, and stores this determined data in the data storage.

4. A drive arrangement according to claim 1, and further comprising a data storage in which the curve of the motoring torque for at least 720° of the crankshaft angle is stored.

5. A drive arrangement according to claim 4, wherein the control means detects at least one of the speed and the temperature of the internal combustion engine during motor operation of the generator arrangement and determines at least one of the instantaneous curve of the motoring torque for a number of different values, at least one time-dependent curve of the speed, and temperature, and stores this determined data in the data storage.

6. A drive arrangement according to claim 1, wherein the control means checks the motoring torque for deviations from the given reference quantities, at least one of after a predetermined number of starting processes of the internal combustion engine, after a given mileage of the motor vehicle, and above a fixed temperature of the internal combustion engine.

7. A drive arrangement according to claim 1, wherein the generator arrangement has a plurality of winding phases and the control means determines the instantaneous curve of the motoring torque from current detected in the individual winding phases.

8. A drive arrangement according to claim 1, and further comprising alarm means activatable by the control signal representing the operating disturbance.

9. A drive arrangement to claim 1, and further comprising a diagnostic system having an error storage, the control signal representing the operating disturbance sets the error storage of the diagnostic system.

10. A drive arrangement according to claim 1, wherein the control means is provided so that when an operating disturbance occurs the control means activates an emergency control program which performs at least one of reducing maximum output of the internal combustion engine, reducing maximum speed of the internal combustion engine, and reducing fuel quantity injected for defective cylinders of the internal combustion engine.

11. A drive arrangement according to claim 1, and further comprising alarm means activatable by the control signal representing the operating disturbance and a diagnostic system having an error storage which is set by the control signal representing the operating disturbance.

12. A drive arrangement according to claim 1, and further comprising alarm means activatable by the control signal representing the operating disturbance, the control means in response to an operating disturbance activates an emergency control program which performs at least one of reducing maximum output of the internal combustion engine, reducing maximum speed of the internal combustion engine, and reducing a fuel quantity injected for defective cylinders of the internal combustion engine.

13. A drive arrangement according to claim 1, and further comprising a diagnostic system having an error storage that is set by the control signal representing the operating disturbance, the control means in response to the operating disturbance activates an emergency control program which performs at least one of reducing maximum output of the internal combustion engine, reducing maximum speed of the internal combustion engine and reducing an amount of fuel injected for defective cylinders of the internal combustion engine.

14. A drive arrangement according to claim 13, and further comprising alarm means activatable by the control signal representing the operating disturbance.

15. A drive arrangement for a motor vehicle, comprising: an internal combustion engine having a crankshaft; at least one controlling element that affects at least one of engine output, engine torque and engine speed; an actuating drive for controlling the at least one controlling element; an electric generator arrangement connected with the crankshaft of the internal combustion engine so as to be fixed with respect to rotation relative thereto; at least one electric motor which is powered by the generator arrangement and drives the motor vehicle; an accelerator pedal; electronic control means for controlling at least the actuating drive and at least one of electrical output generated by the generator arrangement and electrical output received by the electric motor as a function of the positions of the accelerator pedal; means for detecting an actual value of the speed of one of the internal combustion engine and the generator arrangement; a data storage for storing reference values; and means for detecting an actual value of one or the electrical output generated by the generator arrangement and the electrical output received by the electric motor, the electronic control means including speed regulating means for maintaining the actual speed at a given reference speed on an average with respect to time, and output regulating means for maintaining the actual electrical output at a given reference output on an average with respect to time, the electronic control means detecting an instantaneous curve of current of the generator arrangement depending on an instantaneous angular position of the crankshaft of the internal combustion engine, the electronic control means further determining the instantaneous curve of the torque of the internal combustion engine as a function of the electric current depending on the angular position of the crankshaft and comparing it with the reference values for at least one of magnitude and the instantaneous curve of the torque which are stored in the data storage, the control means still further generating a control signal which represents all operating disturbance when deviations with respect to one of a predetermined quantity and predetermined curve occur.

* * * * *